(12) United States Patent
Hoffschmidt et al.

(10) Patent No.: US 8,801,188 B2
(45) Date of Patent: Aug. 12, 2014

(54) METHOD FOR ALIGNING THE HELIOSTATS OF A HELIOSTAT FIELD

(75) Inventors: Bernhard Hoffschmidt, Köln (DE); Joachim Göttsche, Jülich (DE); Markus Sauerborn, Jülich (DE); Helmut Essen, Wachtberg (DE); Gört Luedtke, Wachtberg (DE); Gregor Biegel, Wachtberg (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 332 days.

(21) Appl. No.: 13/382,424

(22) PCT Filed: Jul. 9, 2010

(86) PCT No.: PCT/EP2010/059933
§ 371 (c)(1),
(2), (4) Date: Feb. 29, 2012

(87) PCT Pub. No.: WO2011/004022
PCT Pub. Date: Jan. 13, 2011

(65) Prior Publication Data
US 2012/0145143 A1    Jun. 14, 2012

(30) Foreign Application Priority Data
Jul. 10, 2009  (DE) .......................... 10 2009 032 584

(51) Int. Cl.
*G03B 21/00* (2006.01)
*G01S 13/88* (2006.01)
*G05D 3/10* (2006.01)
*G05B 15/02* (2006.01)
*G01S 13/06* (2006.01)
*F24J 2/07* (2006.01)
*F24J 2/38* (2014.01)
*F24J 2/10* (2006.01)

(52) U.S. Cl.
CPC ................. *G05B 15/02* (2013.01); *G01S 13/88* (2013.01); *G05D 3/105* (2013.01); *F24J 2/07* (2013.01); *F24J 2002/385* (2013.01); *F24J 2/10* (2013.01); *G01S 13/06* (2013.01)

USPC ............... 353/3; 359/853; 359/854; 359/855; 126/569; 126/572

(58) Field of Classification Search
CPC ................ Y02E 10/47; F24J 2/38; F24J 2/07; F24J 2200/04; F24J 2002/385; F24J 2002/1076; F24J 2002/0084; F16M 11/18; F16M 11/10
USPC .............. 353/3; 359/853, 854, 855, 856, 861; 126/572, 569, 573, 574, 600, 601, 602
See application file for complete search history.

(56) References Cited

U.S. PATENT DOCUMENTS 4,536,847 A * 8/1985 Erickson et al. ............... 702/150
7,667,833 B1 * 2/2010 Diver ............................. 356/138

(Continued)

FOREIGN PATENT DOCUMENTS

ES        2155031 A1     4/2001

OTHER PUBLICATIONS

International Search Report dated Dec. 2, 2010 from corresponding International Patent Application No. PCT/EP2010/059933—3 pages.

(Continued)

*Primary Examiner* — Sultan Chowdhury
(74) *Attorney, Agent, or Firm* — Maier & Maier, PLLC

(57) ABSTRACT

A central distance measuring device, which can be directed at the heliostats, is used to determine the settings of the heliostats of a heliostat field. The distance measuring device measures the space between a plurality of measuring points from the measuring site and, based on this, determines the spatial alignment of the respective heliostat. A computer contains astronomical solar altitude software and controls an actuating device of the heliostat such that the heliostat assumes the alignment intended according to the solar altitude. With the invention, position sensors and/or angle sensors on the individual heliostats are avoided. All heliostats are aligned by a central computer.

6 Claims, 2 Drawing Sheets

(56) References Cited

U.S. PATENT DOCUMENTS

| | | | |
|---|---|---|---|
| 7,836,879 B2* | 11/2010 | Mackamul | 126/600 |
| 2005/0274376 A1* | 12/2005 | Litwin et al. | 126/685 |
| 2009/0055024 A1 | 2/2009 | Kay | |
| 2009/0107485 A1* | 4/2009 | Reznik et al. | 126/600 |
| 2009/0126774 A1 | 5/2009 | Taylor, II et al. | |
| 2011/0235202 A1* | 9/2011 | Ezawa et al. | 359/853 |

OTHER PUBLICATIONS

Nerenguel M et al., "An Artificial Vision-based Control System for Automatic Heliostate Positioning Offset Correction in a Central Receiver Solar Power Plant", Solar Energy, Pergamon Press. Oxford, GB, Bd. 76, Nr. 5, Jan. 1, 2004.

* cited by examiner

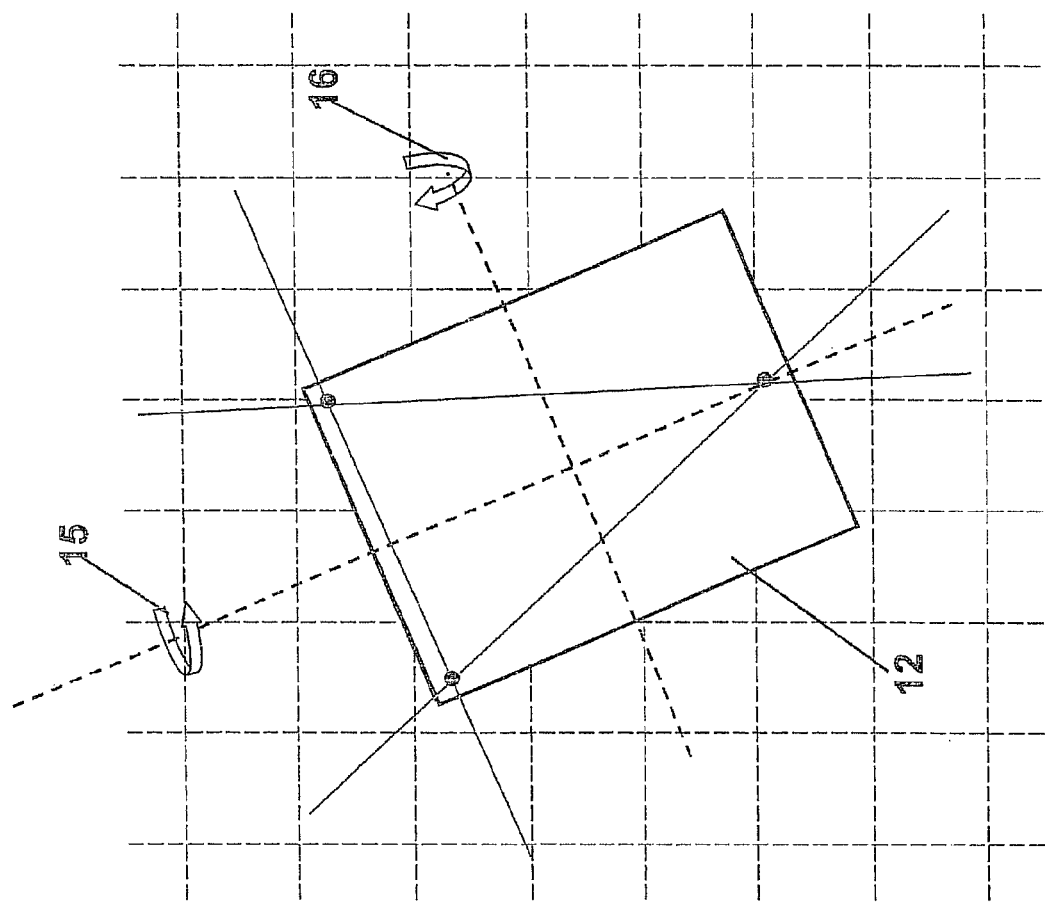

METHOD FOR ALIGNING THE HELIOSTATS OF A HELIOSTAT FIELD

RELATED APPLICATIONS

This is the U.S. national stage application which claims priority under 35 U.S.C. §371 to International Patent Application No.: PCT/EP2010/059933 filed on Jul. 9, 2010, which claims priority to German Patent Application No. 102009032584.0 filed on Jul. 10, 2009, the disclosures of which are incorporated by reference herein their entireties.

The invention refers to a method for aligning the adjustable heliostats of a heliostat field reflecting solar energy onto a radiation receiver, using a computer calculating or storing intended set values for each heliostat of the heliostat field for at least one position of the sun.

In solar power towers, large mirrors tracking the sun along two axes are used to focus direct solar radiation onto a radiation receiver arranged at the top of a solar tower. The highly concentrated radiation heats the radiation receiver, which may be several 100 $m^2$ in size, to high temperatures. The radiation receiver is an absorber through which flows a heat transfer medium such as air, water, salt or thermal oil. Here, temperature values of 500° C. to 1000° C. are achieved. The heat generated is carried away from the absorber by the heat transfer medium and is supplied, for example, to a steam turbine for generating electric current.

The heliostats are mobile mirrors with a typical mirror surface of 8 $m^2$ to up to 180 $m^2$. Depending on the size of the power plant and of the mirrors, 300-2000 heliostats or more are arranged in a heliostat field such that the reflected solar radiation is aligned exactly with the absorber in the tower.

The heliostats can be moved in two directions by a motor: an azimuth movement (horizontal pivoting) and an elevation movement (change in angle of elevation). Further, each heliostat comprises a sensor to detect the current azimuth angle and another sensor to detect the current angle of elevation. A central computer receives the data from all of the sensors. The computer includes astronomic software on solar altitude and calculates the respective solar altitude based on date and time and adjusts the heliostats such that the incident solar radiation is reflected from each heliostat onto the radiation receiver. This is done with consideration to the respective position of a heliostat within the heliostat field. The tracking of the individual heliostats is effected such that the respective current target position of the heliostats is recalculated in comparison with the data on solar altitude and the data from the angle sensors and is reported to the drives of the heliostats via a data network, which then move the heliostats to the new position.

The known method requires large numbers of angle sensors, entailing personnel-intensive installation and maintenance. The linking to a central data acquisition device and the final calibration cause high costs and lead to a considerable protraction of the installation time of the heliostat field. In addition, such solar plants must withstand all weather for ten to twenty years, which means numerous failures of sensors have to be expected.

It is an object of the invention to provide a method for aligning the adjustable heliostats of a heliostat field, wherein the effort in sensors for determining the actual alignment of the individual heliostats is reduced.

The method of the invention is defined in claim 1. It is characterized in that for the determination of the actual set values of the heliostats a distance measuring device is set up at a measuring site, which measures the distance of a plurality of measuring points of the mirror surface of a heliostat from the measuring site, and that the computer controls an actuating device at the heliostat such that predetermined intended set values are achieved.

In the method of the present invention, a central measurement of the alignment of a plurality of heliostats is performed without corresponding measuring devices or sensors existing on the heliostats. The measurement is effected in a contactless manner using a highly sensitive distance measuring device directed to the mirror surface of a heliostat and taking distance measurements at several measuring points thereof. Thereby, the plane of the respective mirror surface can be determined. From this, the azimuth angle and the elevation angle of the mirror surface are obtained. These are calculated by the computer. The computer can now move the heliostat to an alignment intended by controlling the actuating device. The fact that the alignment intended has been accomplished is indicated by the fact that the intended set values have been reached.

The measuring site may at the radiation receiver or close to the radiation receiver. However, the invention is not limited to such a positioning of the measuring site. Rather, the measuring site could be provided at any position provided a line of sight exists between that position and all heliostats of the heliostat field concerned.

The measuring points on the mirror surface of a heliostat may be measuring points that can be differentiated from the other parts of the mirror surface, the distance measuring device determining the distance between each measuring point and the measuring site. However, it is possible to select certain portions of the mirror surface as measuring points for the distance measuring device that do not differ from other portions. This requires a highly focusing distance measuring device that uses microwave radar or a laser, for example. Preferably, a measuring beam emitted from the distance measuring device is guided over the mirror surface of a heliostat in one scanning operation. Here, the distance variation can be detected either continuously or punctually. From these distance variations, it is also possible to determine the area of the mirror surface. Thereby, an examination for mirror defects is possible in addition.

The invention further refers to a heliostat field with heliostats reflecting the solar radiation onto a radiation receiving device, each heliostat comprising an actuating device for aligning the heliostat with the solar altitude. According to the invention, a contactless distance measuring device is provided that can be directed to respective individual heliostats and determines the plane of the mirror surface using measuring points on the mirror surface of the heliostat. It is further provided that a computer controls the actuating device of the respective heliostat such that, given a certain solar altitude, the radiation reflected from the mirror surface impinges on a radiation receiver. This device is advantageous in that it requires no sensors for the determination of the respective heliostat position.

Preferably, the distance measuring device is formed by a radar device with a frequency above 10 GHz, in particular above 50 GHz.

Preferably, the radiation receiving device is on a tower or on a hill in a position raised above the heliostat field.

The invention makes it possible to measure all heliostats of a solar power plant from a central measuring site. It is also possible, however, to divide the entirety of the heliostats into smaller fields and to associate a measuring site to each of these fields. In the context of the present specification, a heliostat field may also be a sub-field.

The invention offers the following advantages:

The orientations of the heliostats are measured from a central measuring site. Thereby, local position sensors at the heliostats—two angle transmitters per heliostat—become obsolete. One may also omit the otherwise necessary hardware for the data transfer to the central control.

The personnel-intensive installation of individual angle transmitters in all heliostats can be omitted, including the calibration necessary in the field.

The maintenance effort is reduced because only a single measuring system has to be checked.

The complete maintenance including the recalibration of the heliostat field requires no solar radiation and is also possible under cloudy conditions or at night.

The field measuring technique can be applied regardless of the heliostat type so that different types of mirrors can be used in the same field.

The following is a detailed description of an embodiment of the invention with reference to the accompanying drawings.

In the Figures:

FIG. 2 is a schematic illustration of a heliostat with a corresponding actuating device.

Figure 1:
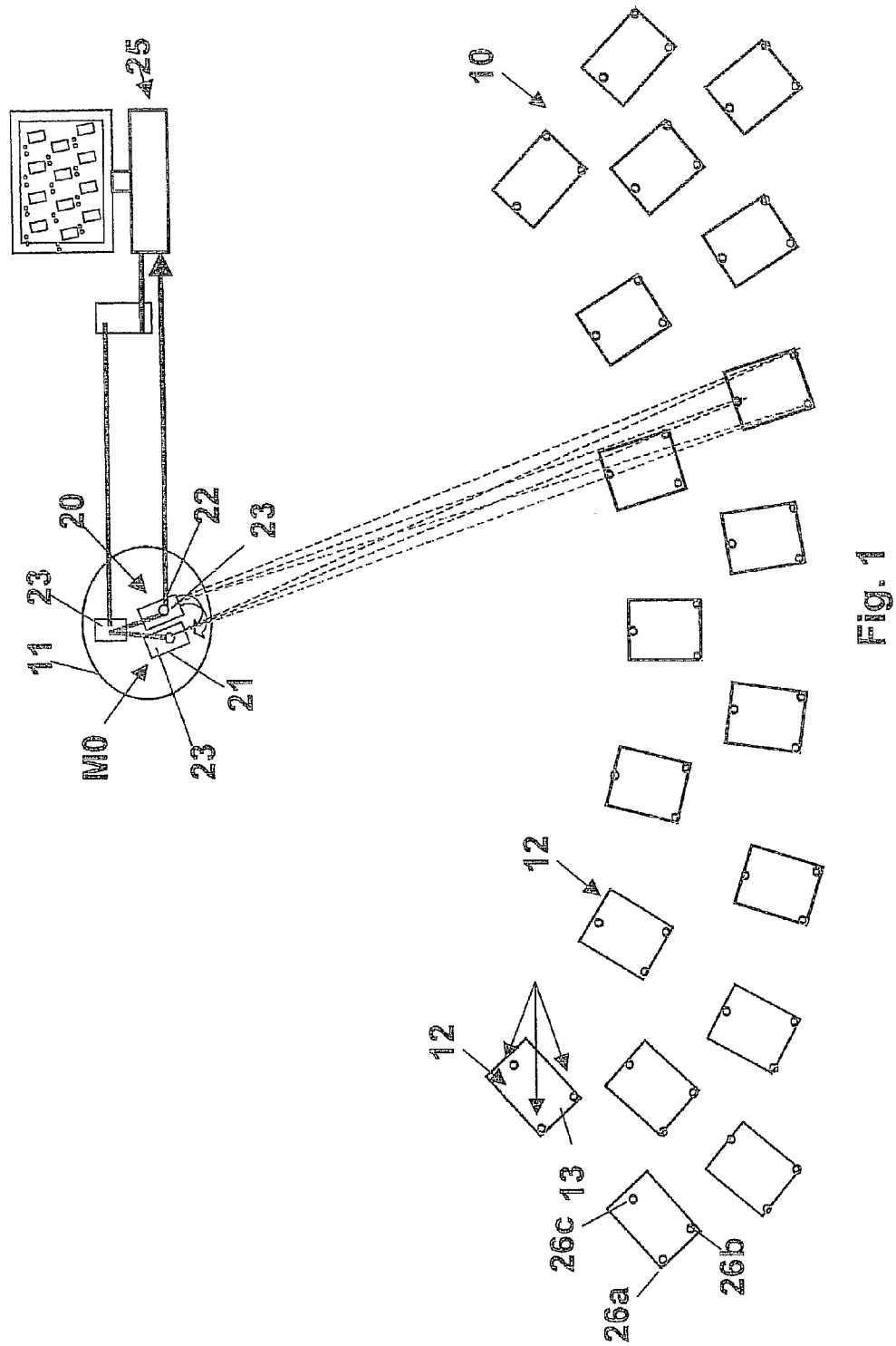
FIG. 1 is a schematic top plan view on a tower power plant.

The solar power plant illustrated in the Figures comprises a heliostat field 10 arranged around a tower. The heliostat field comprises a plurality of heliostats 12. These are mirrors reflecting impinging solar radiation by their front mirror surface 13. The heliostats are arranged around the tower 11 in any optional form. A radiation receiver (not illustrated) is mounted at the top of the tower, with which the individual heliostats are aligned so that the solar radiation impinges on the radiation receiver in a concentrated form. The radiation is absorbed and the radiation energy is converted into heat. A heat transfer medium is used to transport this heat from the radiation receiver to a load.

As illustrated in FIG. 2, each heliostat is provided with an actuating device. The same is formed by an azimuth drive 15 and an elevation drive 16. These drives are high-precision motors, such as stepper motors. The azimuth drive 15 causes a pivoting of the mirror surface 13 in the horizontal direction. The elevation drive 16 causes a change of the elevation angle by pivoting movement.

A distance measuring device 20 is installed on the tower 11, which in the present instance is a radar apparatus in the gigahertz range. The radar apparatus is illustrated schematically as a transmitter 21 and a receiver 22. It can be pointed exactly to each of the heliostats and within a heliostat it can also be pointed to different measuring points. For this purpose, rotary motors 23 are provided that allow for a highly precise targeting.

The distance measuring device 20 including the rotary motors 23 is controlled from a central computer 25. The computer 25 holds the position and orientation data of all heliostats 12. Moreover, it contains highly precise astronomical solar altitude software so that exact information about the solar altitude at a respective location is available at any time.

A plurality of measuring points 26a, 26b, 26c is defined on the mirror surface 13 of each heliostat. Each measuring point can be a measuring point whose reflection characteristics differ from those of the mirror surface 13 so that it can be recognized by the distance measuring device as a target. In addition to being situated on the mirror, the measuring points may also be situated laterally, above and below the mirror. The location of the distance measuring device 20 is referred to as the measuring site MO. The distance measuring device measures the distance of each measuring point from the measuring site MO in a highly precise manner. By determining the coordinates of three measuring points it is possible to determine the plane which the mirror surface 13 is in. Thus, an indication is obtained on the actual alignment of the heliostat. The computer 25 determines the intended alignment of the heliostat and controls the actuating device 15, 16 such that the actual alignment coincides with the intended alignment. Thereby, a central control of the alignment of every single heliostat is performed.

If the mirror surfaces 13 of the heliostats are planar, the three-point measurement described above is sufficient. However, the invention is also suited to detect desired or undesired irregularities of the mirror surface. A scanning beam can be passed over the mirror surface, while simultaneously determining the varying distance from the measuring site MO. Thereby, a desired mirror curvature can be checked or it can be determined whether a mirror surface that should be planar is uneven.

The invention claimed is:

1. A method for aligning adjustable heliostats of a heliostat field reflecting solar radiation onto a radiation receiver, comprising:

using a computer that calculates or has stored therein solar set values for each heliostat of the heliostat field for at least one solar altitude, wherein a distance measuring device is set up at a measuring site to determine the current set values of the heliostats, the device measuring the distance of a plurality of measuring points on the mirror surface of a heliostat from the measuring site, and wherein the computer controls an actuating device at the heliostat such that predetermined intended set values are reached.

2. The method of claim 1, further comprising providing measuring points on the heliostat that can be differentiated from the mirror surface, and determining the distances of the measuring points from the measuring site.

3. The method of claim 1, wherein the distance measuring device emits a measuring beam that is directed over the mirror surface of a heliostat in a scanning operation.

4. The method of claim 1, wherein the distance measuring device is used to examine a heliostat for mirror defects.

5. A heliostat field with heliostats reflecting solar energy onto a radiation receiver, each heliostat in the heliostat field comprising an actuating device for aligning the heliostat according to the solar altitude, wherein a contactless distance measuring device is provided that can be directed to individual heliostats and determines a plane of a mirror surface from measuring points on the mirror surface, and wherein a computer controls the actuating device of the respective heliostat such that, at a predetermined solar altitude, radiation reflected from the mirror surface impinges on the radiation receiver.

6. The heliostat field of claim 5, wherein the distance measuring device is a radar device with a frequency above 10 GHz.

* * * * *